(12) United States Patent
Milinusic et al.

(10) Patent No.: US 6,975,353 B1
(45) Date of Patent: Dec. 13, 2005

(54) IMMERSIVE CAMERA SYSTEM

(76) Inventors: Tomislav F. Milinusic, 3289 Cardiff Way, Decatur, GA (US) 30033; Ronnie J. H. Wilmink, 3717 Lamp Post Cir., Marietta, GA (US) 30067; Richard J. Kiser, 2930 Hamilton Rd., Cumming, GA (US) 30041; Eugene D. Schmitt, 5465 Bridle Dr., Cumming, GA (US) 30040; Alexander F. Warchol, 1940 Six Branches Dr., Roswell, GA (US) 30076

( * ) Notice: Subject to any disclaimer, the term of this patent is extended or adjusted under 35 U.S.C. 154(b) by 869 days.

(21) Appl. No.: 09/837,916

(22) Filed: Apr. 18, 2001

Related U.S. Application Data

(60) Provisional application No. 60/269,676, filed on Feb. 16, 2001, provisional application No. 60/269,434, filed on Feb. 16, 2001, provisional application No. 60/240,171, filed on Oct. 13, 2000, provisional application No. 60/211,500, filed on Jun. 14, 2000, provisional application No. 60/211,400, filed on Jun. 14, 2000, provisional application No. 60/198,309, filed on Apr. 19, 2000.

(51) Int. Cl.[7] .................. H04N 7/00; H04N 5/225; H04N 5/247; G01C 3/00; G02B 26/08
(52) U.S. Cl. .................. 348/218.1; 348/36; 348/37; 348/262; 348/264; 348/265; 348/335; 359/201; 359/212; 359/725; 356/3; 356/17; 356/18
(58) Field of Search .................. 348/36, 37, 38, 348/39, 218.1, 262, 264, 265, 335; 356/3, 356/17, 18, 3.05, 3.09, 201, 212, 725, 726

(56) References Cited

U.S. PATENT DOCUMENTS

| | | | | |
|---|---|---|---|---|
| 3,563,146 A | * | 2/1971 | Miller | ............... 396/21 |
| 4,058,831 A | * | 11/1977 | Smith | ............... 348/37 |
| 4,626,905 A | * | 12/1986 | Schmidt | ............... 348/36 |
| 4,915,498 A | * | 4/1990 | Malek | ............... 356/5.04 |
| 4,979,815 A | | 12/1990 | Tsikos | |
| 4,982,092 A | | 1/1991 | Jehle | |
| 5,309,212 A | * | 5/1994 | Clark | ............... 356/5.09 |
| 5,497,188 A | * | 3/1996 | Kaye | ............... 348/36 |
| 5,721,585 A | * | 2/1998 | Keast et al. | ............... 348/36 |
| 5,790,183 A | * | 8/1998 | Kerbyson | ............... 348/37 |
| 5,805,325 A | * | 9/1998 | Clune | ............... 359/226 |
| 5,949,430 A | | 9/1999 | Robertson et al. | |
| 6,034,716 A | * | 3/2000 | Whiting et al. | ............... 348/36 |
| 6,291,831 B1 | * | 9/2001 | Koren | ............... 250/584 |
| 2003/0063816 A1 | * | 4/2003 | Chen et al. | ............... 382/284 |

FOREIGN PATENT DOCUMENTS

FR    2791793 A1  * 10/2000  .......... G06T 17/40

* cited by examiner

*Primary Examiner*—David L. Ometz
*Assistant Examiner*—Brian Genco
(74) *Attorney, Agent, or Firm*—Davis & Bujold, P.L.L.C.

(57) ABSTRACT

An immersive scanning camera provides for a high speed imager to capture a scene of interest on a pixel by pixel basis. Distance data is collected for each pixel. This distance data is representative of the distance from the immersive camera of the object depicted by the pixel data.

23 Claims, 19 Drawing Sheets

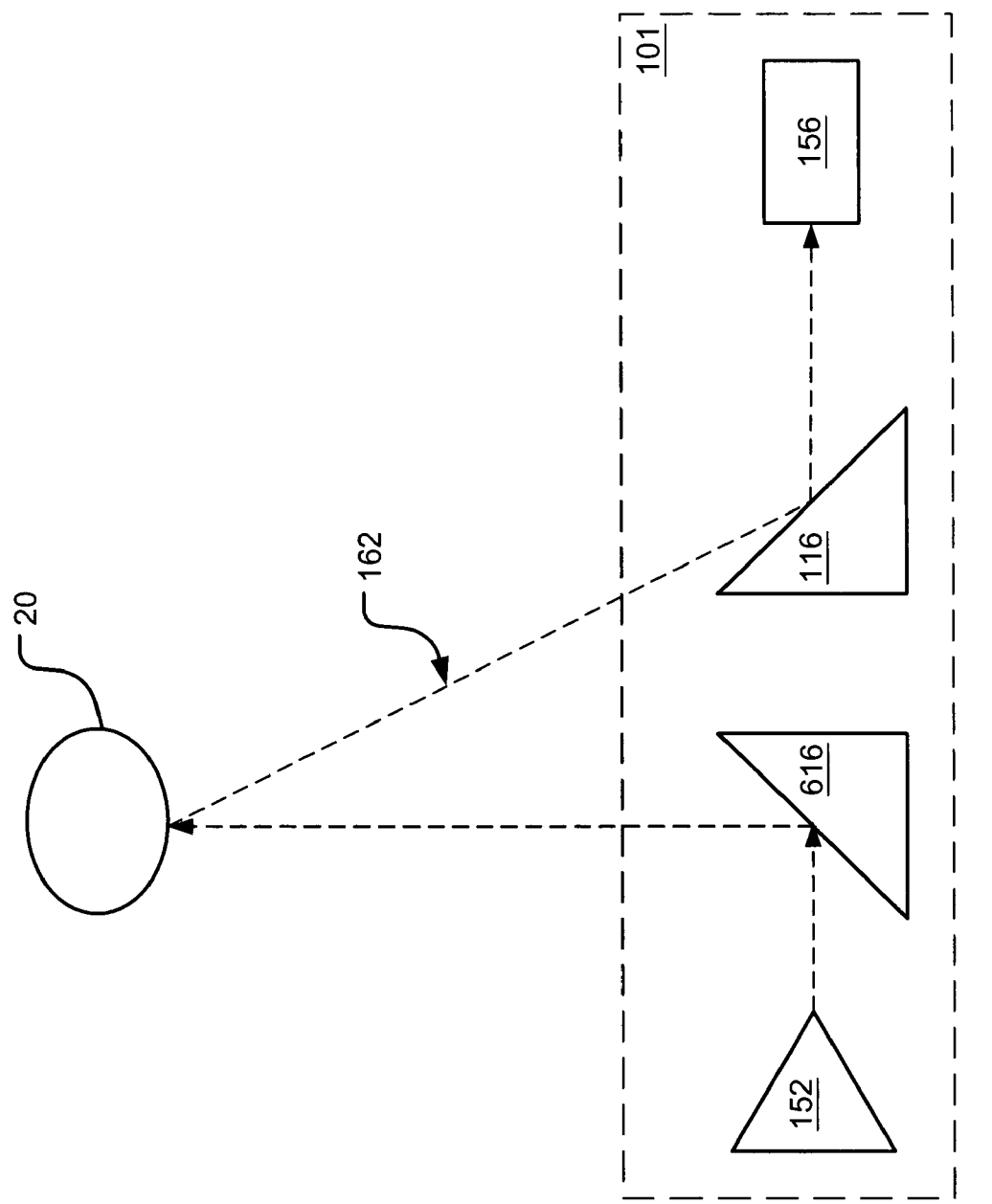

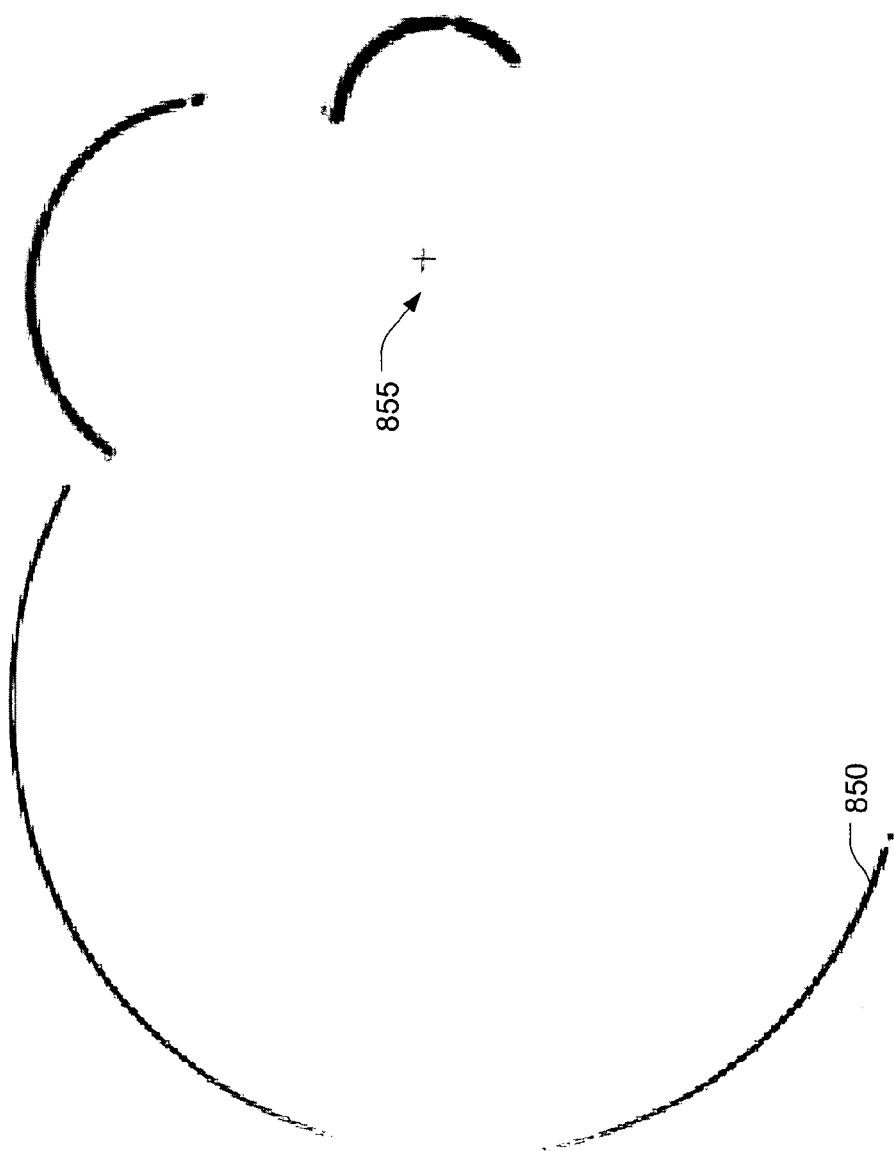

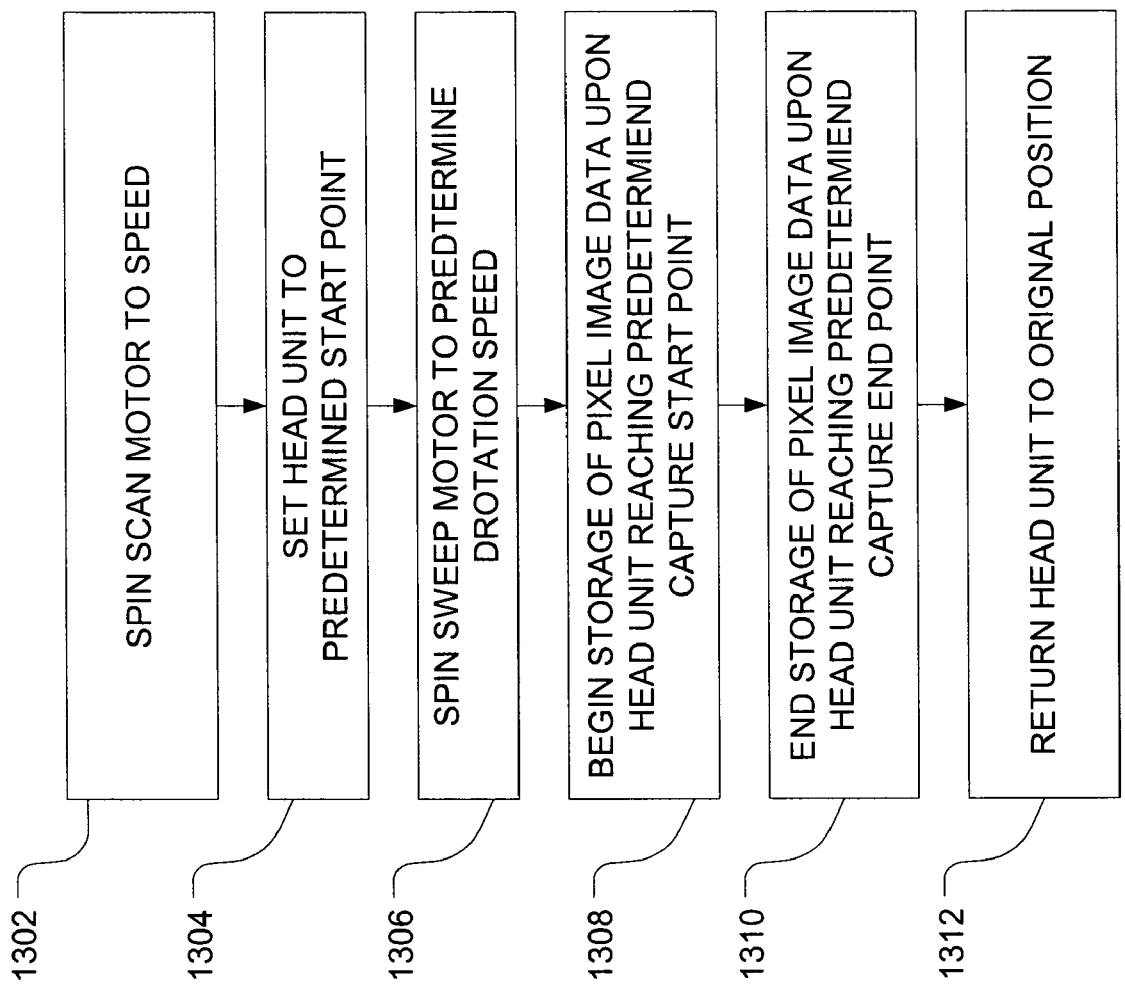

US 6,975,353 B1

IMMERSIVE CAMERA SYSTEM

CLAIM OF PRIORITY

This application claims priority to copending U.S. provisional applications entitled, "High Resolution Immersive Scanning Multi-Spectral 3-Imaging System" having Ser. No. 60/198,309 and filed Apr. 19, 2000, "High Resolution Immersive Scanning Multi-Spectral 3-D Imaging System" having Ser. No. 60/211,400 and filed Jun. 14, 2000, "High Resolution Telescopic Multi-Spectral Scanning Imaging System" having Ser. No. 60/211,500 and filed Jun. 14, 2000, "Scanning Camera And Data Storage System" having Ser. No. 60/240,171 and filed Oct. 13, 2000, "Scanning Camera And Survelliance System" having Ser. No. 60/269,434 and filed Feb. 16, 2001 and "Survelliance Camera System" having Ser. No. 60/269,676 and filed Feb. 16, 2001, all of which are entirely incorporated herein by reference.

TECHNICAL FIELD

The present invention is generally related to an image capture system and more particularly to a system and method for optically imaging a predetermined scene and generating high-resolution image data representative of the scene.

BACKGROUND OF THE INVENTION

Imaging devices capable of capturing an immersive or 360° scene are known and have been used to recreate a virtual view of a given scene. Unfortunately, these known imaging devices are not useful for critical imaging applications, such as volumetric measurement or security surveillance, where high resolution is preferable. Further, while known systems are capable of providing immersive images of a given scene, they do not provide the ability to simultaneously acquire image, or texture data, along with position or range data relating to the position of the objects within a scene relative to the image capture device.

Thus, given the above noted shortcomings of the prior art, an unaddressed need exists in the industry to address the aforementioned deficiencies and inadequacies, as well as others that will become apparent below.

SUMMARY OF THE INVENTION

Briefly described, in architecture, one embodiment of the system can be implemented as follows. A head unit is provided and configured to receive an image light beam and generate an image data signal. The head unit includes a rotating mirror for receiving the image light beam and an optical receiver for receiving the image light beam from the mirror and outputting the image data signal in response thereto. The image data signal is preferably composed of a pixel image signal and a pixel distance signal. A support unit is also provided for supporting and rotating the head unit.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 7 is a block diagram illustrating the travel path of a laser emitted by an alternate embodiment of DDU 150 shown in FIG. 6;

FIG. 8B is a diagram illustrating a depth image;

FIG. 13 is a flowchart illustrating the process of capturing an image according to an embodiment of the present invention.

DETAILED DESCRIPTION OF THE PREFERRED EMBODIMENT

Figure 1A:
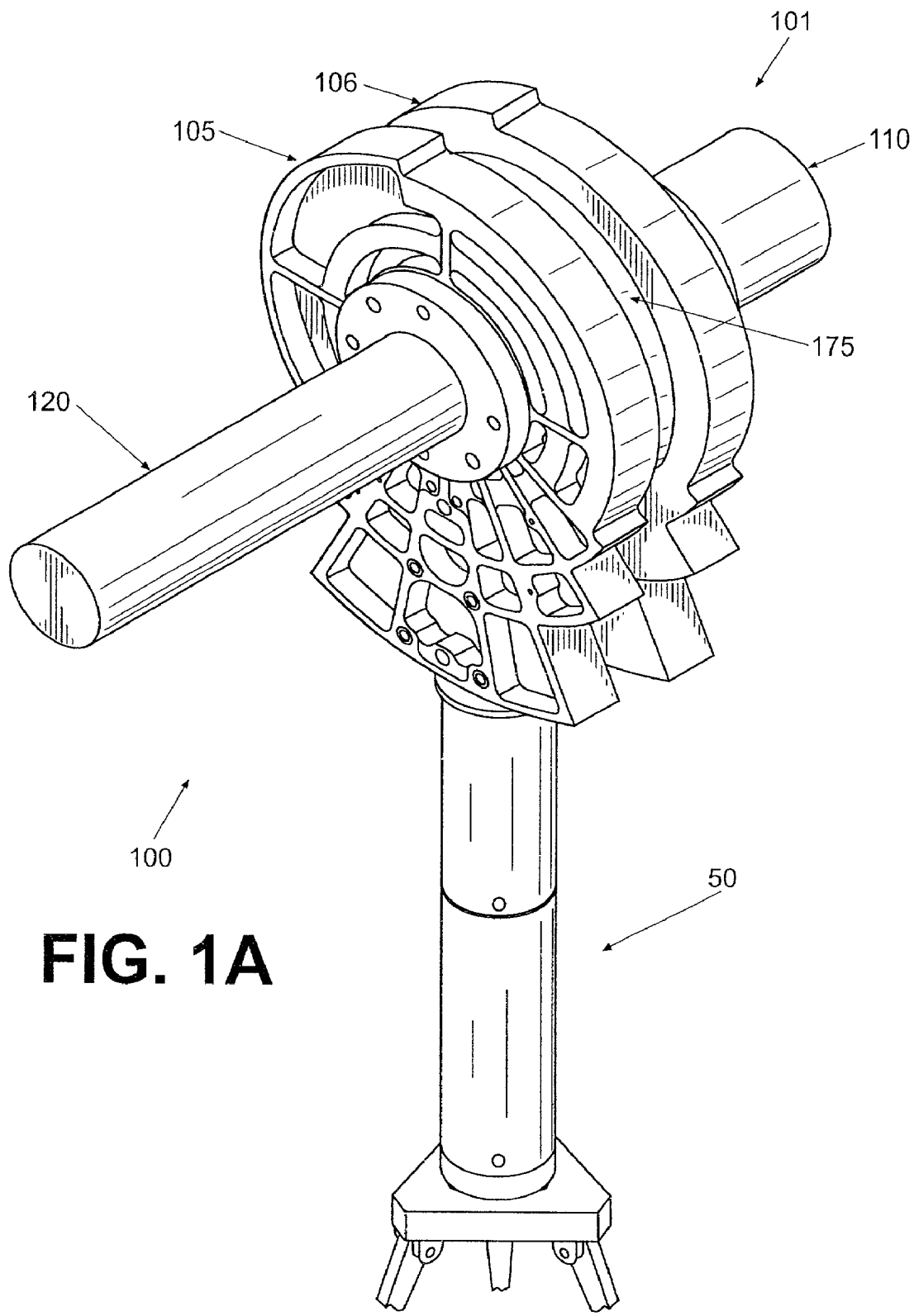
FIG. 1A is a perspective view of elements of a preferred embodiment of an immersive camera according to the present invention.
Figure 1B:
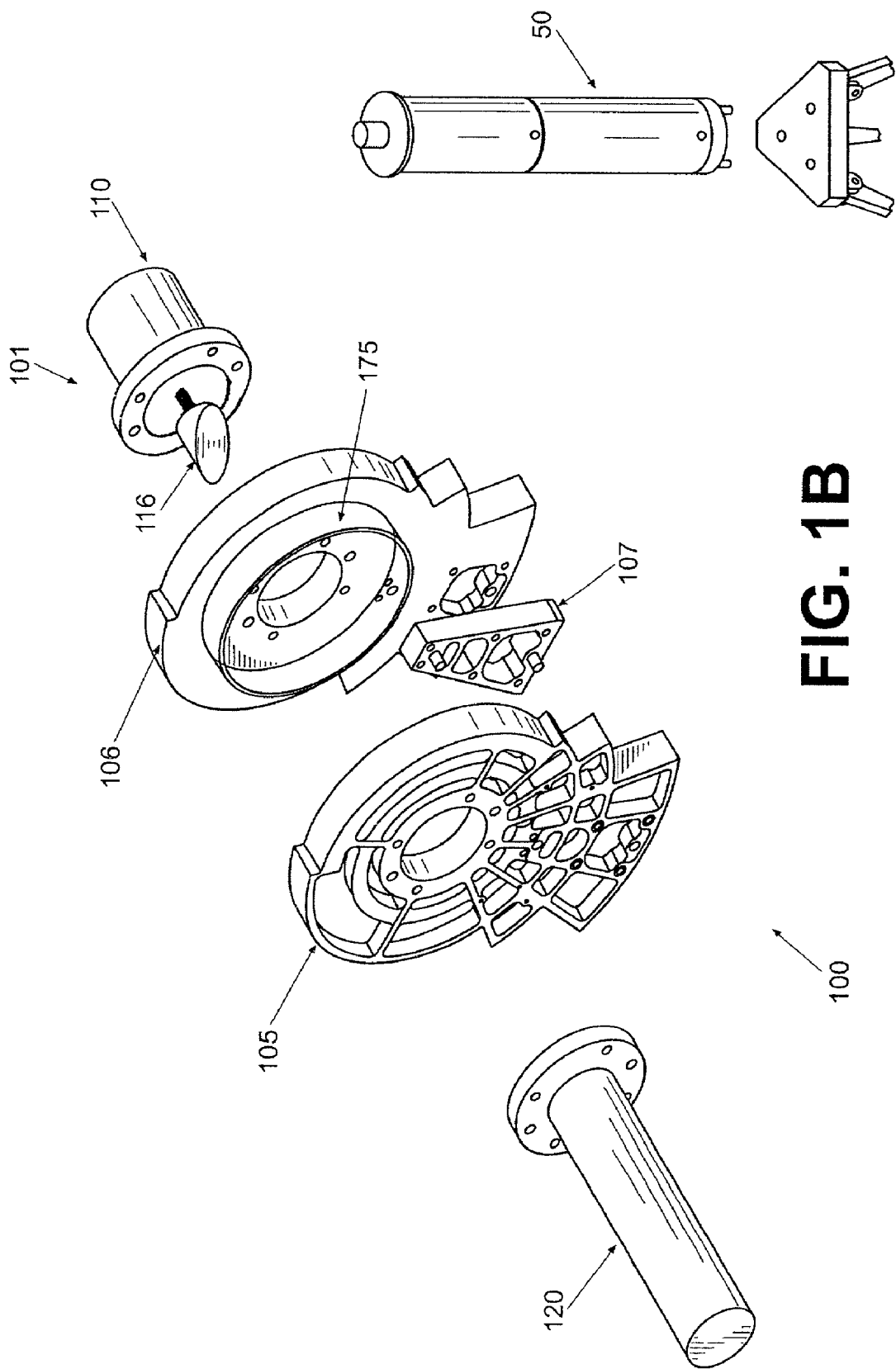
FIG. 1B is an exploded perspective view of elements of the immersive camera of FIG. 1A.
Figure 1D:
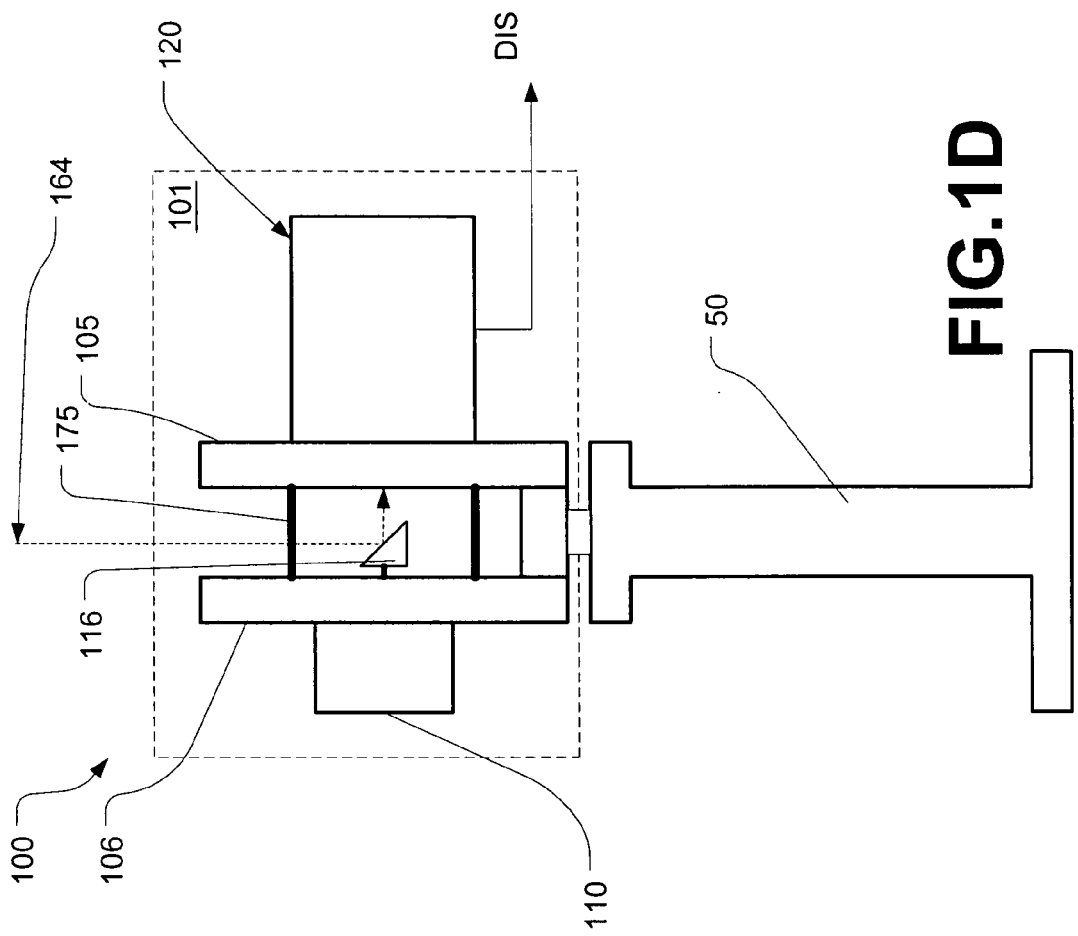
FIG. 1D is a side block diagram view of elements of a preferred embodiment of an immersive camera according to the present invention.
Figure 1C:
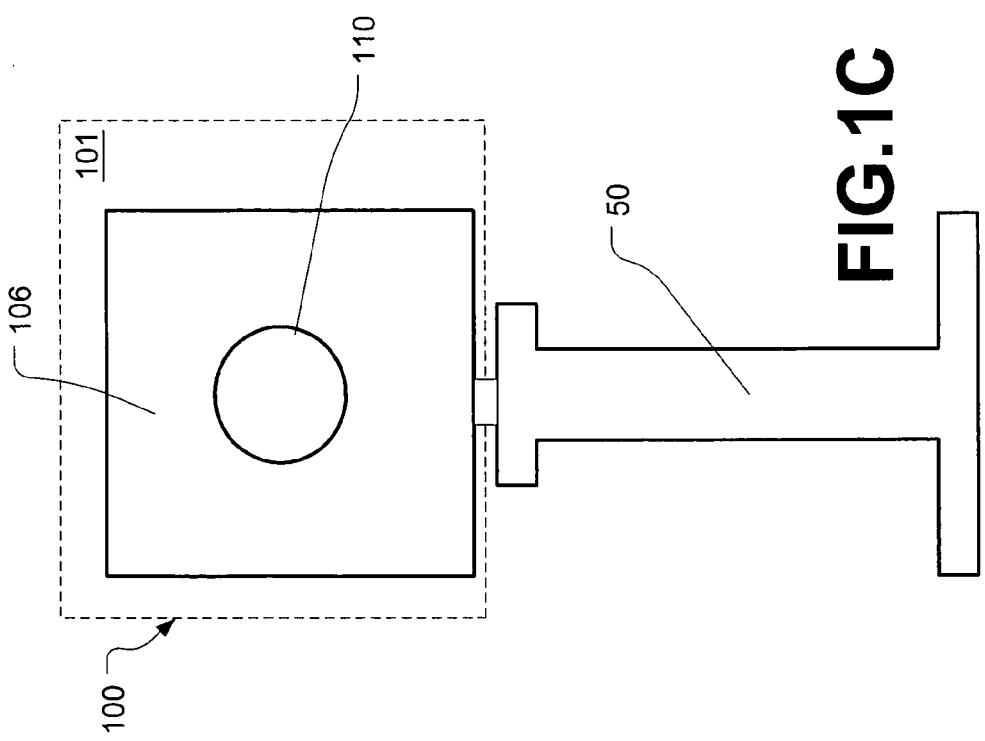
FIG. 1C is a rear block diagram view of elements of a preferred embodiment of an immersive camera according to the present invention.

The preferred embodiment of the present invention provides a system and method for high speed scanning of a scene of interest to produce a high-resolution substantially spherical image data representative of a scene. This system further provides for simultaneous acquisition of image data along with position or range data relating to the position of objects within a scene relative to the image capture device. The immersive camera of the present invention is useful for such applications as generating virtual imagery or representations of an environment or sampling of surface textures within a scene or environment.

With reference to FIG. 1A–FIG. 1D it can be seen that immersive camera 100 may include a head unit 101 and a support unit 50. Head unit 101 includes, among other things, a scan motor 110 for rotating a mirror 116. There is also provided an optical receiver 120 for receiving an image light beam 164 deflected from mirror 116 and generating a digital image signal (DIS), representative of the received image light beam 164. Support unit 50 is configured to preferably support the head unit 101 in a desired position. The digital output image signal may also include position data representative of the position of objects within the captured scene, or image, relative to the camera 100.

Figure 2A:
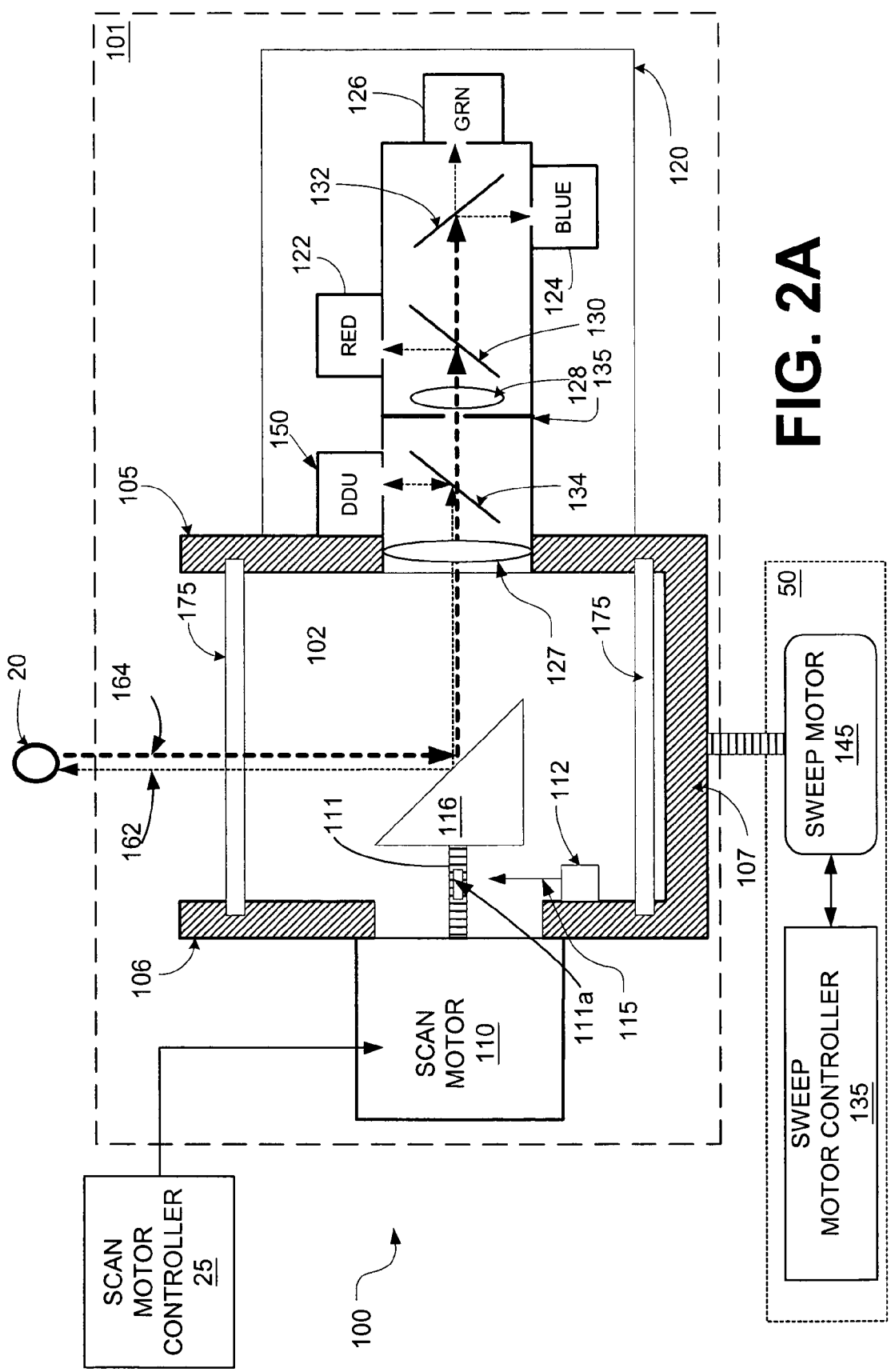
FIG. 2A is a side cross sectional block diagram of further details of an embodiment of the immersive camera system of FIG. 1A.

With reference to FIG. 2A, it can be seen that camera head unit 101 includes a front plate 105 and a rear plate 106 which are separated by a spacing plate 107. Scan motor unit 110 is attached to rear plate 106. Scan motor 110 includes a spindle 111. An angled mirror 116 is attached to the spindle 111 so that angled mirror 116 is positioned within the void 102. Scan motor 110 rotates mirror 116 via spindle 111. Scan motor control unit 25 controls scan motor 110. Scan motor 110 is preferably a DC motor capable of rotating the mirror 116 at between 1000 to 21000 rpm. A transparent annular ring 175 is located between the front plate 105 and the back plate 106. Annular ring 175 forms a seal around the mirror 116 that helps ensure the mirror 116 remains clean and free of debris. A mirror position sensor 112 is provided for monitoring the rotation of spindle 111. In one embodiment, mirror position sensor 112 is attached to back plate 106 and inside the void 102.

Mirror 116 is rotated by the scan controller 110, which is controlled by the scan motor controller 25. During image capture operations, when mirror 116 is rotated 360°, a scan line one pixel wide is captured. As the head unit 101 is rotated by sweep motor 145 180° about the axis defined by the spindle 153 (FIG. 9) camera support 50, a substantially spherical image of the scene of interest can be captured. Image data representative of this substantially spherical image depiction is generated and output, along with distance, or range data, associated with the pixels comprising the image data, as will be discussed further below.

It will be recognized that front plate 105, rear plate 106 and spacing plate 107 may be fabricated as a solid unitary piece if desired. Further, these plates may be combined in any number of ways and still provide the function and structure contemplated by the present invention. Further these plates may be bolted, welded or otherwise connected in a manner that provides for secure connection of the plates to each other.

Optical receiver 120 includes imagers 122, 124 and 126, as well as a distance-detection unit (DDU) 150. Further, there is provided a mirror 134, a collimating lens 128, an aperture screen 135, a dichromatic mirror 130 and a dichromatic mirror 132.

In a preferred embodiment, mirror 134 is configured to reflect light greater than, for example, 750–800 nm and to pass light below, for example, 750–800 nm. Further, mirror 134 may be configured to reflect over 95% of the light greater than 750 nm.

Focusing lens 127 is provided for focusing received image light onto an aperture screen 135. Aperture screen 135 provides an aperture of a predetermined size and shape to allow a portion of the received image light to pass through to collimating lens 128. Collimating lens 128, dichromatic mirror 130 and dichromatic mirror 132 are interposed along the light path between the focusing lens 127 and the imager 126. Focusing lens 127 and the aperture screen 135 are preferably arranged at a distance relative to each other that allows the received image light beam to be "in focus" at the plane on which the aperture screen 135 lies. Light passing through the aperture screen 135 represents a single pixel of the overall image. The size and resolution of the captured image is determined by the combination of the aperture size and the focal length of the focusing lens 127. In an alternate embodiment, no aperture screen 135 is provided in the optical receiver 120.

Dichromatic mirror 130 is aligned to reflect the red light spectrum portion of the received image light beam onto imager 122. Dichromatic mirror 132 is aligned to reflect the blue light spectrum portion of the received image light beam onto imager 132. The remaining green light spectrum portion of the image light beam is passed through dichromatic mirror 132 to the green imager 126.

In one embodiment, each of the dichromatic mirrors 130, 132 and 134 may be configured to separate, or reflect, a particular bandwidth of light from a received light beam. The dichromatic mirrors 130, 132 and 134 may be configured, for example, to reflect 90% or more of a desired bandwidth of light from the received image light beam 164.

In a preferred embodiment, imagers 122, 124 and 126 are photo multiplier tubes (PMTs). Examples of PMTs include, but are not limited to, the Hamamatsu model R4700U-01 for visible spectrum imaging, and the Hamamatsu model R4700U-02 for extended range in the infrared spectrum, each of which are available from Hamamatsu Photonics, K.K Electron Tube Center 314-4, Shimokanzo, Toyooka-villeage, Iwata-gun, Shizuoka-ken, 438-0193 Japan. It will be understood that photomultiplier tubes from other manufacturers, such as, for example, but not limited to, Phillips, Siemens, Hewlett-Packard, etc. are also available and may be suitable for providing desired results. Other types of imagers for converting a light or electromagnetic radiation of a predetermined bandwidth into a corresponding electrical signal, may also be used depending on the particular application at hand, including, for example, but not limited to, charged coupled devices (CCD), photodiodes or complementary metal oxide semiconductor (CMOS) imagers.

Each imager 122, 124 and 126 may be composed of the same type or model of imager. However, since each imager may be configured to respond only to a certain light bandwidth of the received image light beam, for example, only red light spectrum, green light spectrum or blue light spectrum, each imager may be received as being responsive to only a particular predetermined light bandwidth. Alternatively, a single imager responsive to all colors (red, green and blue) could be used in place of multiple separate imagers responsive to only a particular color light bandwidth. Imagers 122, 124 and 126 may also be configured to be responsive to the infrared or ultra-violet light spectrum, thus allowing for infrared or ultra-violet imaging.

In preferred embodiment, mirror 116 is composed of a polished, silver coated aluminum mirror. Other types of mirrors may be used, including, for example, those made of beryllium, pyrex, glass, BK7, composites or other stable materials having a high stiffness coefficient, and that are coated with a highly reflective material such as, for example, but not limited to, silver or gold. Mirror 116 is preferably angled at a 45-degree angle relative to spindle 111.

Figure 2B:
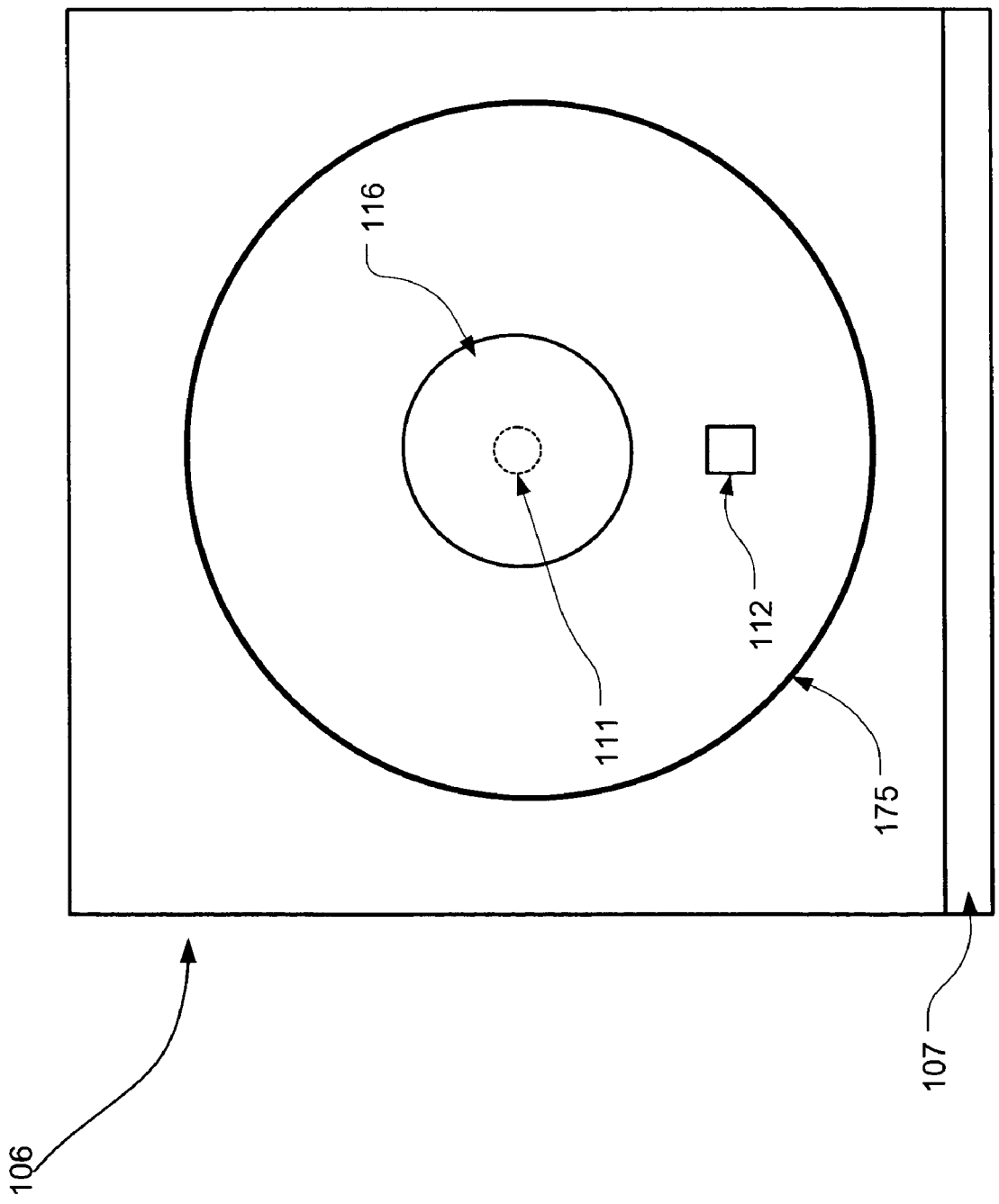
FIG. 2B is a front cross sectional block diagram of mirror 116 in relation to back plate 106 and position sensor 112.
Figure 3:
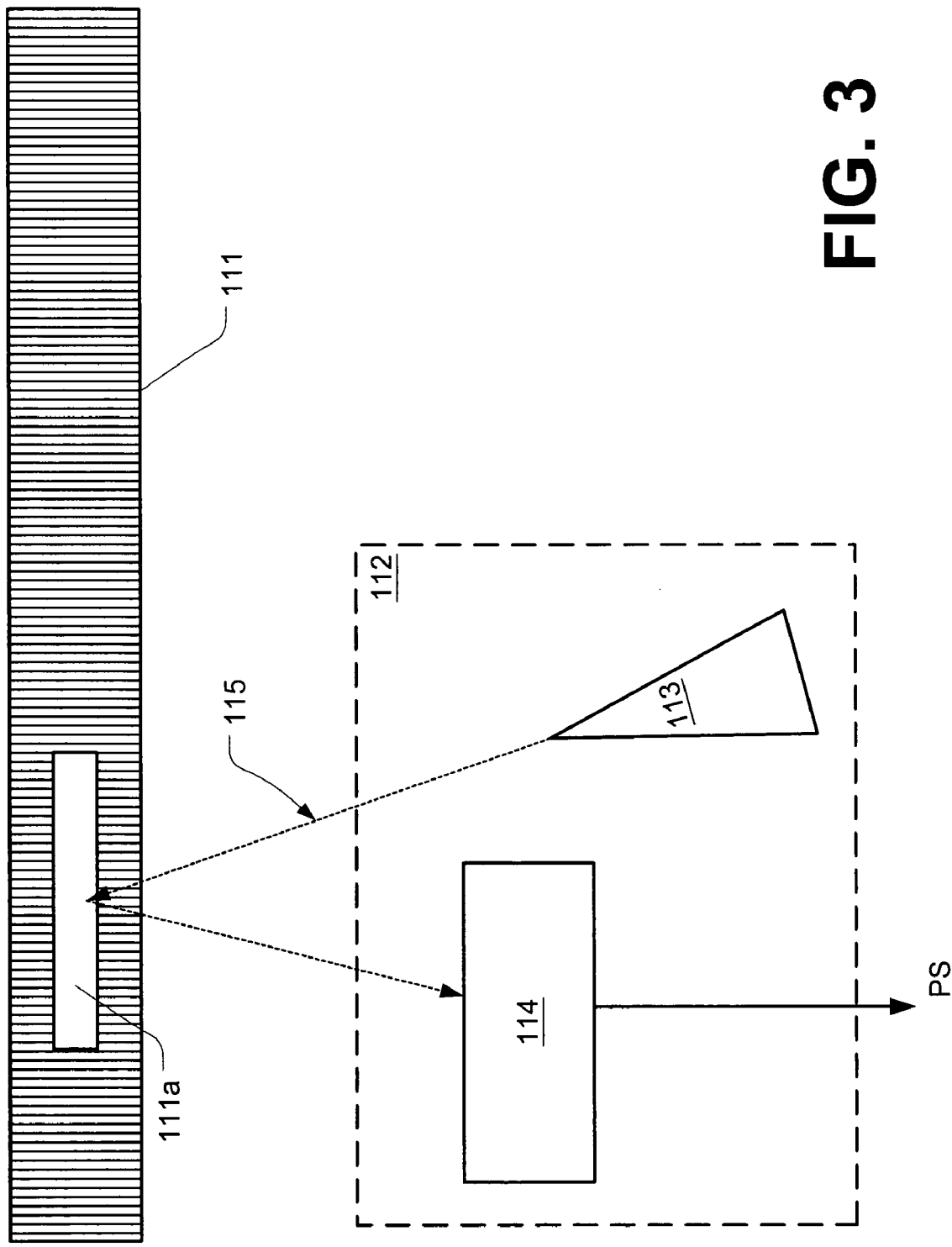
FIG. 3 is a block diagram of mirror position sensor 112.

Spindle 111 includes a reflective surface 111a aligned with mirror position sensor 112. Reflective surface 111a reflects a laser beam 115 projected from mirror position sensor 112. FIG. 3 further illustrates mirror position sensor 112. FIG. 2B shows another view of the mirror 116 relative to back plate 106 and mirror position sensor 112. With reference to FIG. 3, mirror position sensor 112 includes a laser 113 that generates and emits a laser beam 115. A photodetector 114 is provided for receiving a laser beam 115 and generating a position sense signal PS in response. Laser beam 115 is directed to spindle 111. During rotation of spindle 111, reflective surface 111a comes into alignment with the laser beam 115. The laser beam 115 is reflected back to position sensor 112, and more particularly to photodetector 114 which in turn generates a signal indicative of the spindle 111 having rotated past a predetermined point defined by the position sensor 112.

Figure 4A:
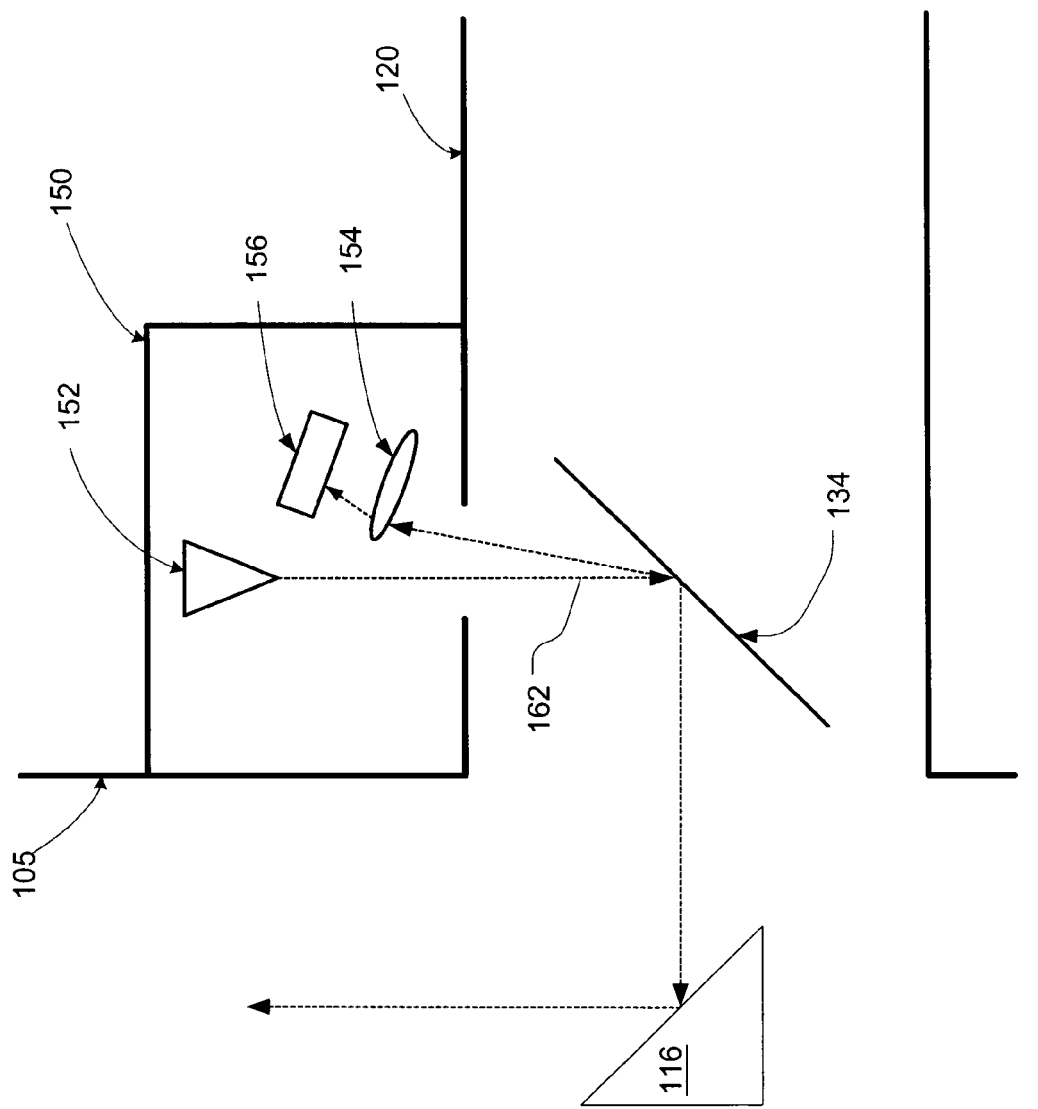
FIG. 4A is a block diagram of a distance detection unit (DDU) 150.
Figure 4B:
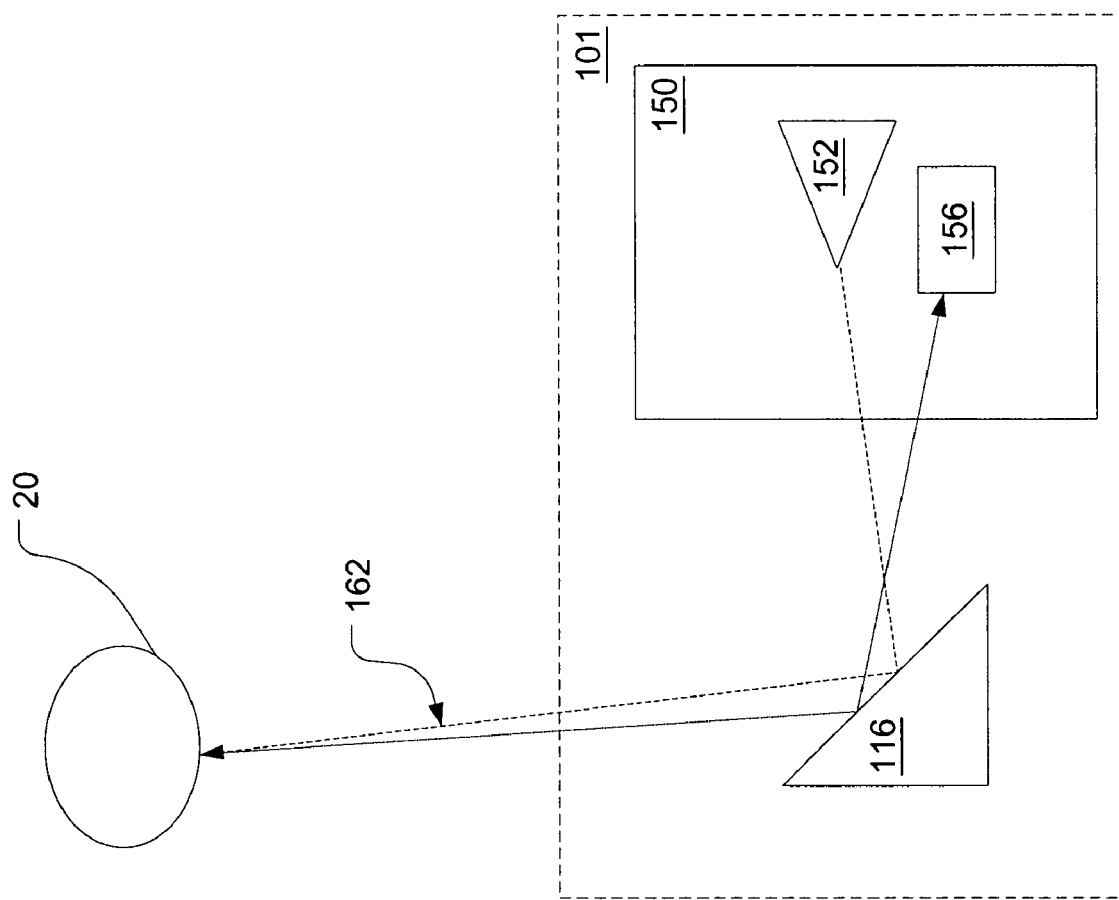
FIG. 4B is a block diagram illustrating the travel path of a laser emitted by DDU 150.

Distance-detection unit (DDU) 150 of FIG. 2A is further illustrated in FIGS. 4A and 4B. Distance-detection unit 150 includes a laser 152 for generating a laser beam 162. There is also provided a focusing lens 154 for focusing a return laser beam (reflection) 163 onto position-sensing detector (PSD) 156. Laser beam 162 is directed to mirror 134, which in turn directs the laser beam 162 onto mirror 116. Mirror 116 reflects the laser beam 162 onto an object(s) 20 within the scene being captured. The laser beam 162 is reflected from an object 20 and returned to the head unit 101 where it is picked up on return by the rotating mirror 116. In turn, mirror 116 directs the reflected laser 162 back onto mirror 134 from where the reflected laser 162 is directed through focusing lens 154 and onto PSD 156.

The focusing lens 154 focuses the laser light beam 162 reflected from an object within the scene being captured, which is in the path of the laser light beam 162, onto the PSD 156. In response, the PSD 156 generates an output signal (PSD OUT) representative of the distance of the object 20 from the head unit 101.

The PSD 156 may be, for example, a Hamamatsu model SS990-01. Further, the PSD 156 may be composed of a light sensitive device, such as, for example, a charge coupled device (CCD) or CMOS imager capable of that generating an output signal representative of the position of the object, relative to the camera head unit 101 from which the laser light beam 162 is reflected.

Figure 4C:
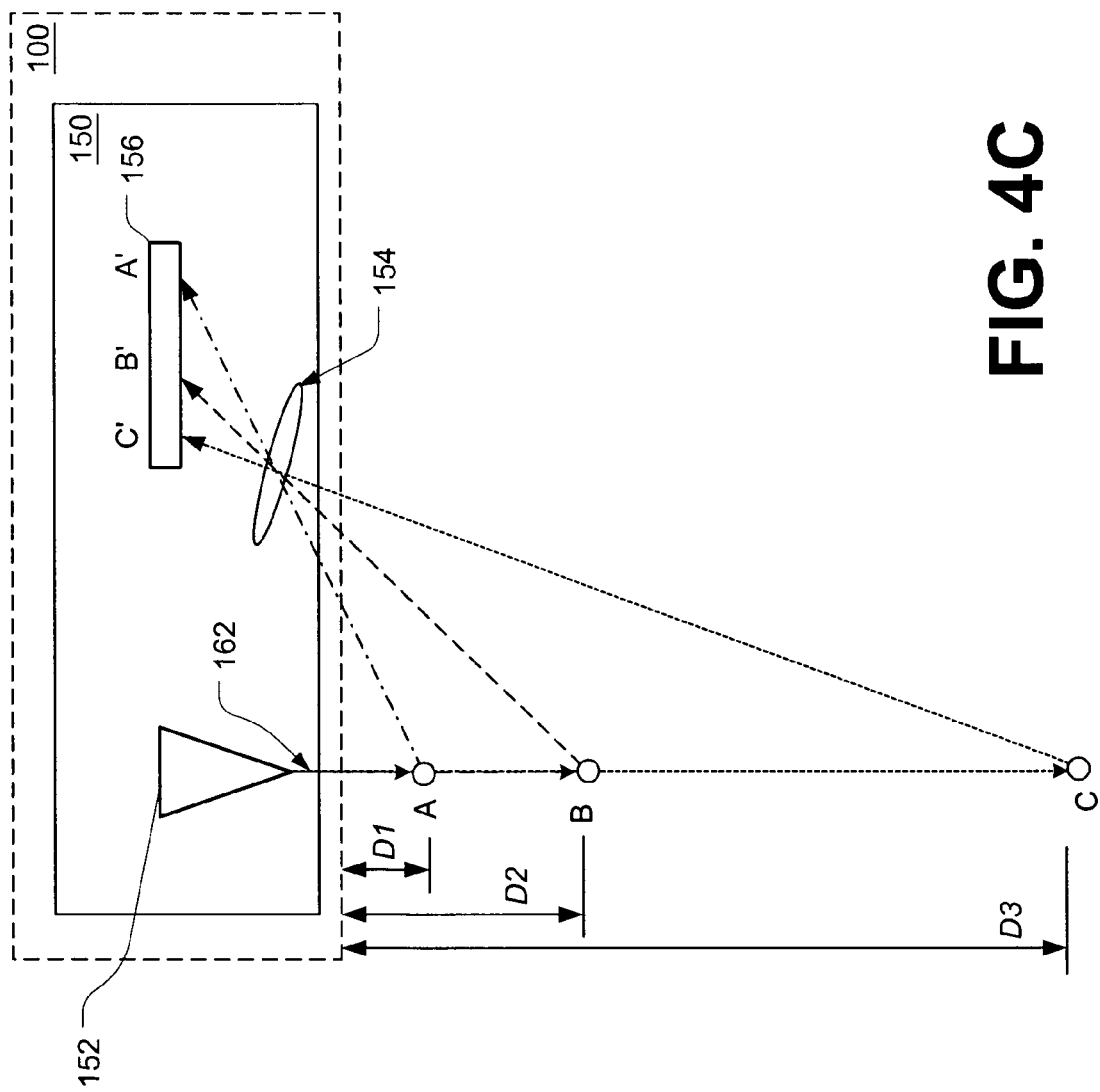
FIG. 4C is a block diagram illustrating the principles of operating DDU 150.

With reference to FIG. 4C a simplified illustration of the path traveled by laser light beam 162 when reflected off of objects A, B and C within a scene, is shown. Objects A, B and C are each located at different distances D1, D2 and D3, respectively, from the laser 152 and thus from the head unit 101.

In this example, laser light beam 162 is emitted from the laser 152. Where laser light beam 162 strikes object A which is located at a distance D1 from the camera 100, the laser light beam 162 is reflected back to the position sensing unit 150 where it strikes focusing lens 154 and is focused onto PSD 156 at a position A'.

Where an object B is struck by the laser light beam 162, the laser light beam 162 is reflected back to the position sensing unit 150 where it strikes focusing lens 154 and is focused onto PSD 156 at a position B'. Similarly, where an object C is struck by the laser light beam 162, the laser light beam 162 is reflected back to the position sensing unit 150 where it strikes focusing lens 154 and is focused onto PSD 156 at a position C'.

Depending upon where the laser light beam 162 strikes the PSD 156, a signal output indicative of the distance to the object reflecting the laser light beam 162 is generated. For example, a laser light beam striking the PSD 156 at position A' may result in a signal output of 8 volts (8VDC), while a laser light beam 162 striking the PSD 156 at point B' may result in an output signal of 4 volts (4VDC). Similarly, a laser light beam striking the PSD 156 at point C' may result in an output signal of 0.5 Volts (0.5VDC).

Laser 152 may be composed of an infrared laser diode or visible light laser diode. The laser 152 may be a continuous laser that emits light at a predetermined wave length, for example, 850 nm wavelength. PSD 156 is preferably configured to be responsive to the laser beam 162 emitted by the laser 152.

Figure 5:
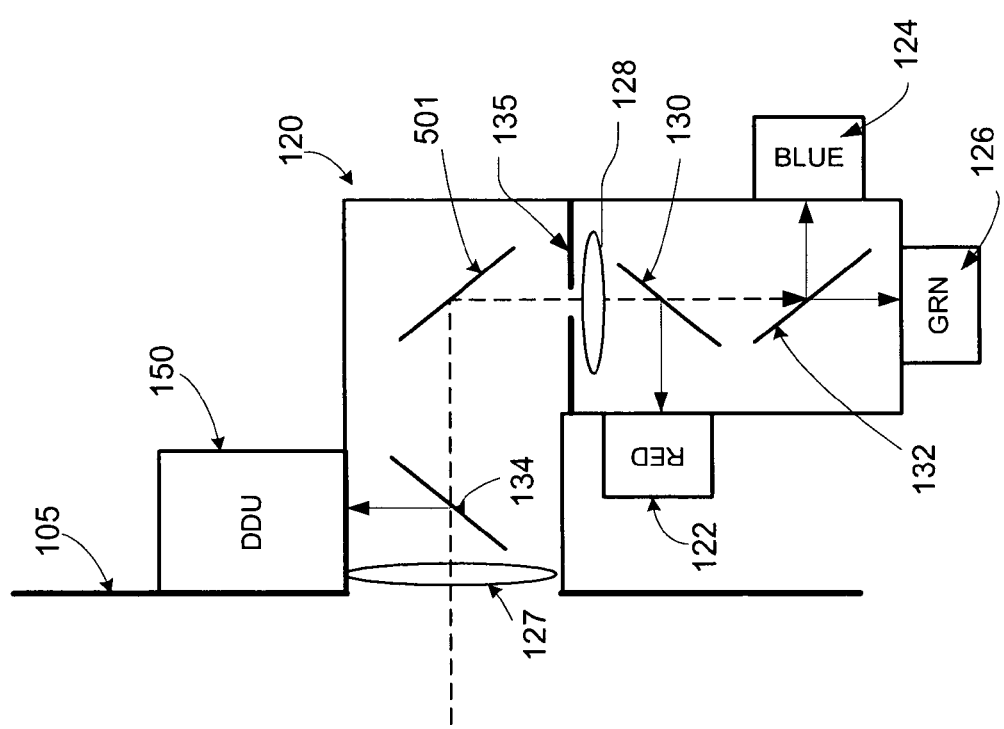
FIG. 5 is a block diagram illustrating an alternate configuration of an optical receiver 120.

An alternate embodiment of optical receiver 120 is shown in FIG. 5. In this implementation, optical receiver 120 is angled to allow for more compact dimensions of the head unit 101. An intermediate mirror 501 is provided to direct the received image light beam 164 to the imagers 122, 124 and 126. A focusing lens 127 is provided for focusing the image light beam 164 onto the aperture screen 135. It will be recognized that optical receiver 120 may be angled at any number of angles to obtain a desired compactness without impacting the functionality thereof. In a preferred embodiment, the focusing lens 127 has a focal length of 125 mm, while aperture screen 135 provides for a circular aperture of 100 μm in diameter. Alternatively, aperture screen 135 may provide for a square aperture having an equal length and width.

Figure 6:
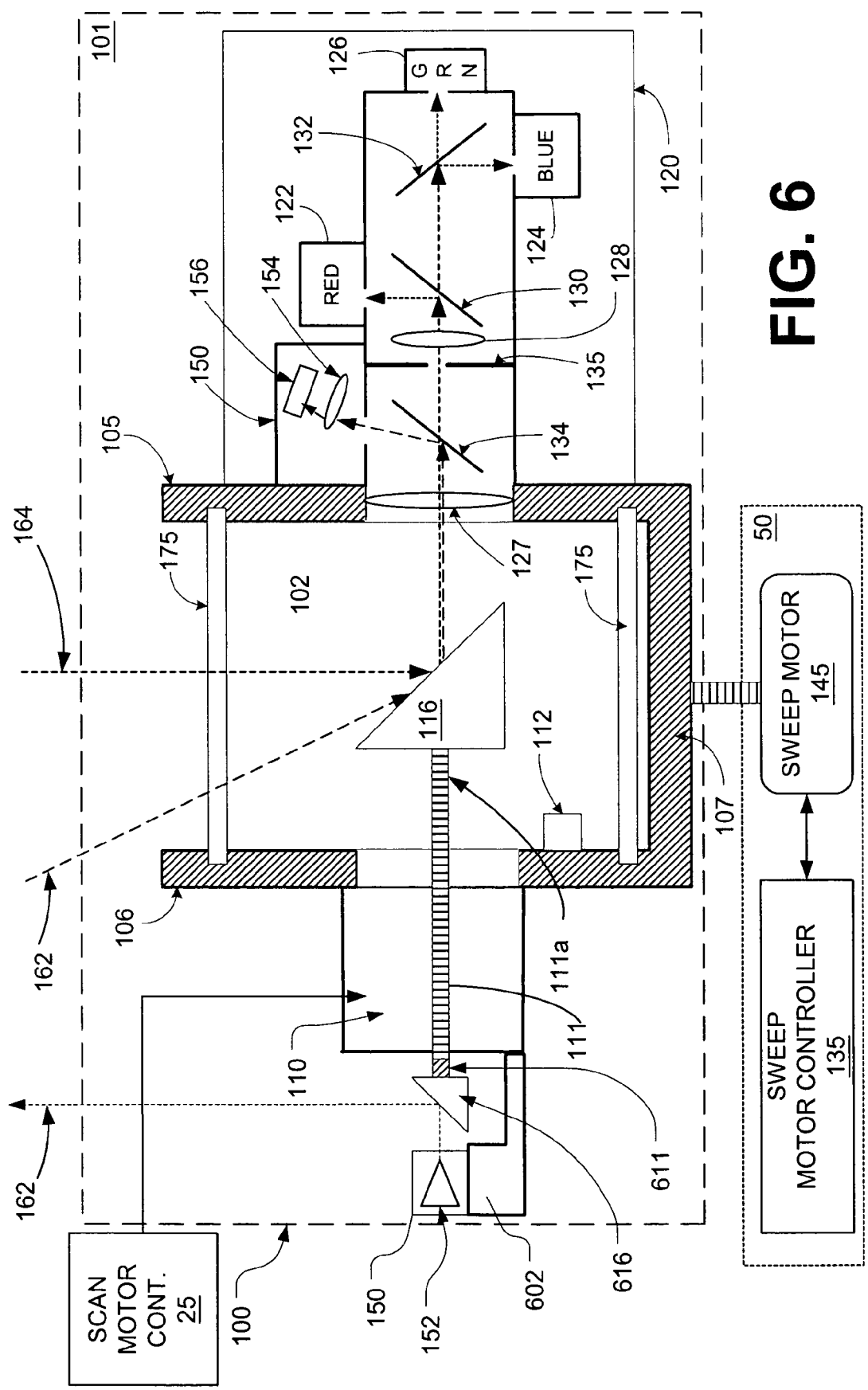
FIG. 6 is a side cross sectional block diagram of an alternate embodiment of immersive camera 100.

FIG. 6 shows an alternate embodiment of immersive camera 100. In this embodiment, distance detection unit 150 is configured so that laser 152 is located at a greater distance from PSD 156. In this embodiment the laser 152 is connected to a support 602. Scan motor 110 is configured to provide for an extension 611 of spindle 111. This spindle extension 511 extends rearward opposite rotating mirror 116. A laser reflecting mirror 616 is attached to the spindle extension 511 and is optically aligned with the same point within the scene as mirror 116. By increasing the distance between the where the laser 251 is transmitted from the head unit 201 and where it is picked up again on return to the head unit 201, the parallax deviation can be increased and thereby yield a higher response resolution of PSD 156. Mirror 616 is preferably a 45° angled mirror that is optically aligned with the laser 152. Further, mirror 616 is preferably aimed so as to have the same concurrent field of view as the mirror 116.

With reference to FIG. 7 and FIG. 6, laser 152 generates and directs a laser light beam 162 onto the mirror 616 as it is rotated by the scan motor 111. The laser 162 is reflected from an object 20 to a variety of places, including mirror 116, which in turn directs the reflected laser 162 back onto mirror 134. In turn, the reflected laser 163 is directed through focusing lens 154 and onto the PSD 156. As spindle 111 rotates one revolution, the laser 152 projects a laser beam 162 onto objects 20 within the scene via mirror 616. The laser beam 162 follows a circular path across a portion of the scene to be captured. Mirror 134 preferably reflects infrared light but allows visible light and ultraviolet light to pass through the mirror 134.

The laser 162 reflected from object 20 along the path that laser 162 is directed is captured via PSD 156, with the added parallax generated by the distance between the two mirrors 116 and 616. Due to this parallax phenomenon, the distance to each point in the scene illuminated by laser beam 162 can be extracted from the circular pattern captured for each revolution of spindle 111 by PSD 156. Spindle 111 rotates the mirror 116 360-degrees about the axis of the spindle 111.

Figure 8A:
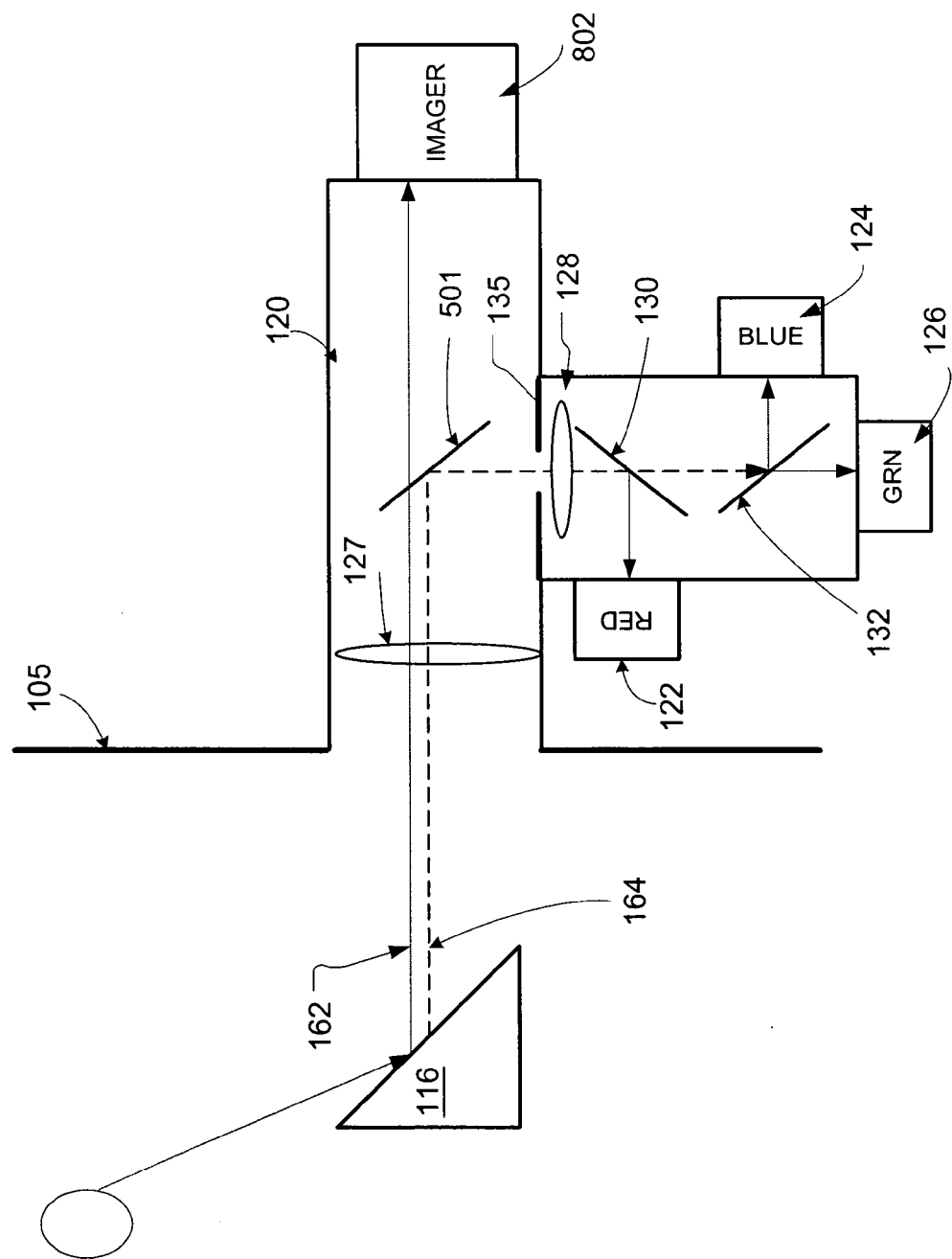
FIG. 8A illustrates a side view block diagram of an alternate configuration for collecting distance data.

FIG. 8 illustrates an alternate embodiment based on the embodiment of FIG. 6 in which distance detection unit 150 is replaced with a two dimensional imager 802. In this embodiment, distance data is collected via imaging the laser 152 onto a two dimensional imager 802, such as a charge coupled device (CCD), complementary metal oxide semiconductor (CMOS) imager or the like, to generate a "depth image" depicting distance information for a respective rotation, or group of rotations, of mirror 116. As the laser beam 162 generated by a laser (not shown) and directed into the scene, is reflected from an object 20 in a scene, it is picked up by the mirror 116 and directed into optical receiver 120. In this embodiment, optical receiver 120 provides for an imager 802. Mirror 501 is configured so as to pass the laser beam 162 directly to the imager 802. Unlike the embodiment of FIG. 6, mirror 134 is not needed here as the laser light 162 is directly received by the imager 802.

As the distance of the object(s) 20 in the scene vary, the points on the imager at which the laser beam 162 strikes will also vary. In a preferred embodiment, the imager 802 will activate and receive laser beam 162 during one complete revolution of the mirror 116. Once one complete revolution has been completed, the image will be read out of the imager 802 and stored to image data storage unit 601 as a depth image. For each revolution of the mirror 116 one 'depth image' is generated. One such image is stored for each revolution, thus the frequency depends on the speed of the motor and spindle 111. Where the mirror 116 is rotated at, for example, 12000 rpm (or 200 Hz), 200 depth images per second (or a subset with high resolution imagers) may be generated and saved to image data storage unit during an image capture operation. Where the head unit 201 is rotated thru a 180° sweep during capture operations and a desired scan resolution is 16,0000×8,000 pixels the sweep would take 40 seconds to complete and yield a total of 8000 depth images. Imager 802 may be composed of, for example, a charge coupled device (CCD) or complementary metal oxide semiconductor (CMOS) imager. In a preferred embodiment, a CMOS imager may be used, such as, for example, the Photobit model PB-1024 1-inch CMOS Active-Pixel Digital Image Sensor.

FIG. 8B illustrates a depth image captured by imager 802 during one complete revolution of the mirror 116. A scan plot 855 is illustrated. Each point along the scan plot 855 represents distance or range data associated with a particular image pixel captured during an image capture operation, relative to a reference 850. Reference point 850 may correspond to the relative position of the camera system 200 (FIG. 1A) relative to the pixels represented by the scan plot 855. It will be noted that the scan plot depicts an inverse relationship, in that points along the scan plot that are shown to be closer to the reference point 850 are actually located at a further distance from the camera 200 than those points on the scan plot 855 shown to be nearer.

Figure 9:
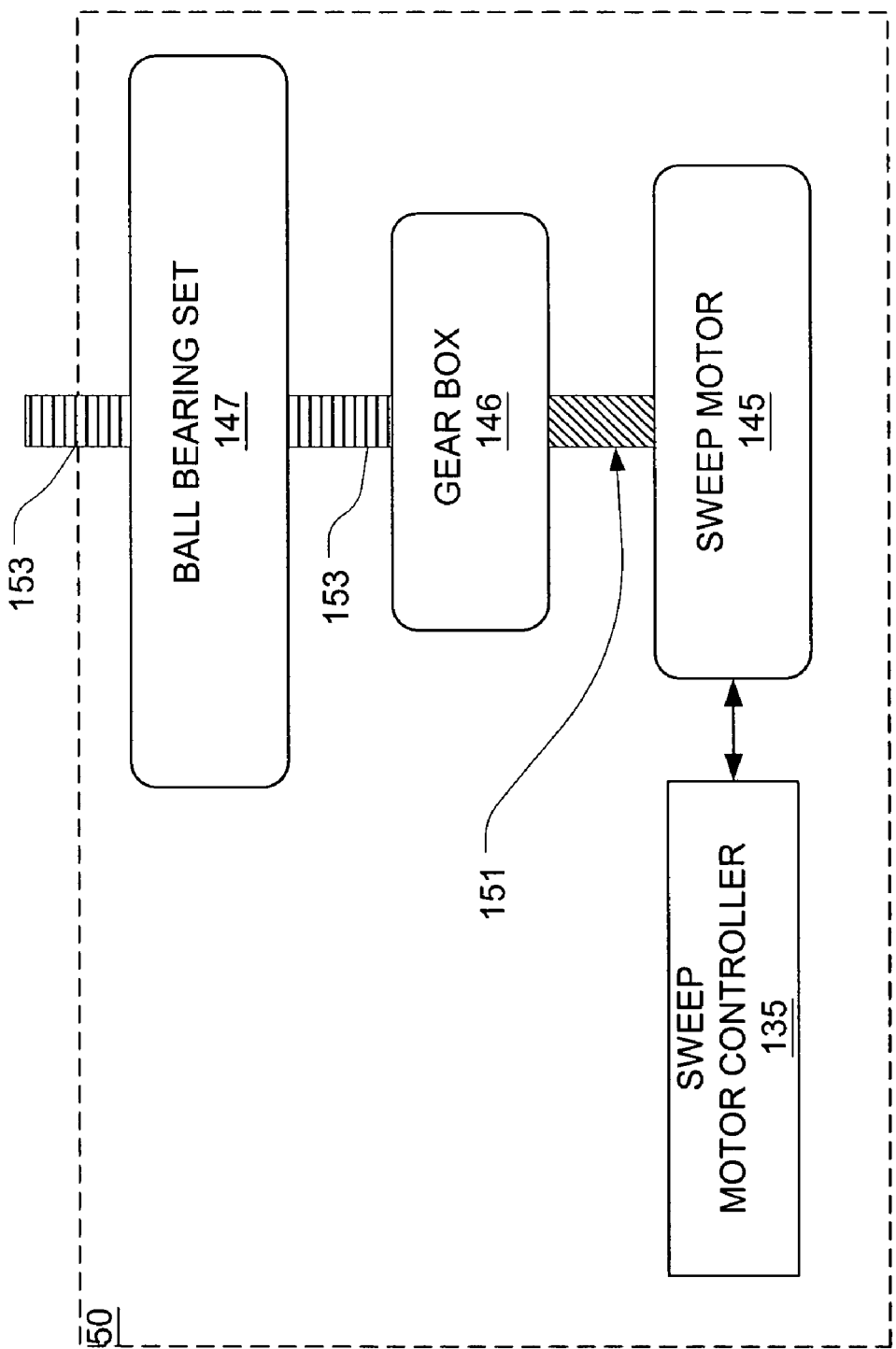
FIG. 9 illustrates camera support 50.

A preferred embodiment of camera support 50 is shown in FIG. 9. Camera support 50 may include a sweep motor 145, a gear box 146 and ball bearing unit 147. Sweep motor 145 includes a rotatable output shaft 151. Output shaft 151 is connected to gear box 146. Gearbox 146 includes a rotatable output shaft 153 that connects to hand unit 101. A ballbearing unit 147 is provided for stabilizing the output shaft 153. Sweep motor 145 rotates the camera head unit 101 about an axis y. A sweep motor control unit 135 controls sweep motor 145. The sweep motor 145 is controlled, via an external sweep motor control unit 135 (FIG. 2A).

Control unit 135 may be external to, or included within, the camera support 50. The sweep motor 145 includes a shaft 151. Shaft 151 is attached to gear box 146. An output shaft 153 of gear box 146 is attached to the camera unit 100. Ball bearing unit 147 is provided for supporting shaft 153 so as to allow stable rotation of the head unit 101. Output shaft 153 is preferably configured to provide the necessary weight bearing support for the camera unit 100.

Gearbox 146 is configured to provide a desired number of rotations of shaft 153 for every rotation of output shaft 151. For example, gear box 146 may be configured to rotate output shaft 151 one hundred (100) revolutions for every single rotation of shaft 151 (a 1:100 input-output ratio). Gear box 146 may be configured to provide for other input-output ratios as may be desired, including, but not limited to, 1:625 and 1:2000.

Figure 10:
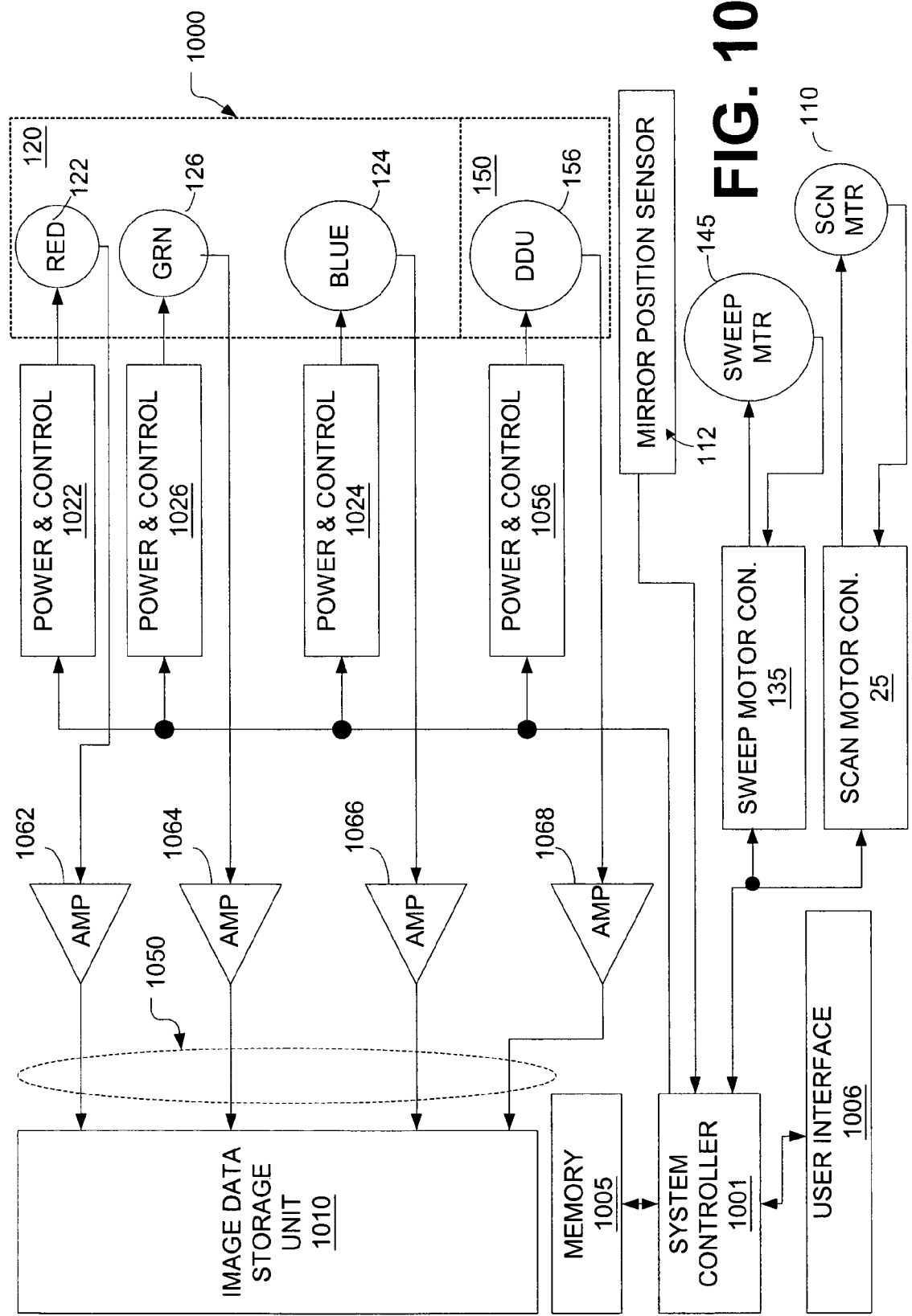
FIG. 10 is an illustration of camera control system 100.

FIG. 10 shows a block diagram of the control and storage systems of the camera 100. In this case, the image signal output 1050 is composed of the signal outputs of each of the imagers 122, 124 and 126. It can be seen that the respective output of each of imagers 122, 124 and 126 are fed to an image data storage unit 1010 via associated amplifier circuitry 1062, 1064, 1066, respectively. Additionally, the output of DDU 150 is provided to the image data storage unit 1010. A system controller 1001 is provided which monitors the position of mirror 116 based upon a mirror position signal generated by mirror position sensor 112. Preferably configured as a general purpose computer operating under the control of software in accordance with the functions described herein, the System controller 1001 controls the functions and operations of power and control units 1022, 1024, 1026 and 1056, mirror position sensor 112, sweep motor control 135, and scan motor control 125.

Data storage unit 1010 may be configured to include an analog to digital convertor for receiving analog data from the head unit 201 where the imagers utilized provide for analog data outputs. A preferred embodiment of data storage unit 1010 is disclosed in a U.S. patent application entitled Data Acquisition System, filed on Mar. 13, 2001 naming inventors Tomislav F. Milinusic, Jesse W. Yates and Roger Kromann and assigned Ser. No. 09/805,229, the disclosure of this U.S. patent application is hereby incorporated herein by reference.

Sweep motor control 135 controls sweep motor 145 in accordance with control signals from system controller 1001, while scan motor control 125 controls scan motor 110 in accordance with control signals from system controller 1001.

Power and control units 1022, 1024, 1026 and 1056 control power applied to imagers 122, 124 and 126 and distance-detection unit 150. These power and control units provide a power to each of the respective imagers 122, 124 and 126 to allow them to generate a continuous stream of image data, in accordance with a control signal from system controller 1001. System controller 1001 provides for control signals to power and control units 1022, 1024 and 1026, as well as motor controllers 125 and 25, based upon position information from position sensor 112, feedback signals from the motor controllers 125 and 25, as well as control input variables that may be defined by an operator or fixed.

System controller 1001 may be configured to receive control input variables via, for example, a user interface 1006. Alternatively, control input variables may be provided to the controller 1001 by retrieving the control input variables from a storage memory 1005. Control variable input may include such input as: desired image resolution, mirror rotation speed; information defining the field of regard information including head unit start position, head unit end position, start capture at mirror angle, end capture at mirror angle; and camera position controls such as move left, move right; as well as image file name, and file format. Alternatively, control input may be provided to controller via retrieval of data stored on a storage medium, or via a combination thereof.

Figure 11:
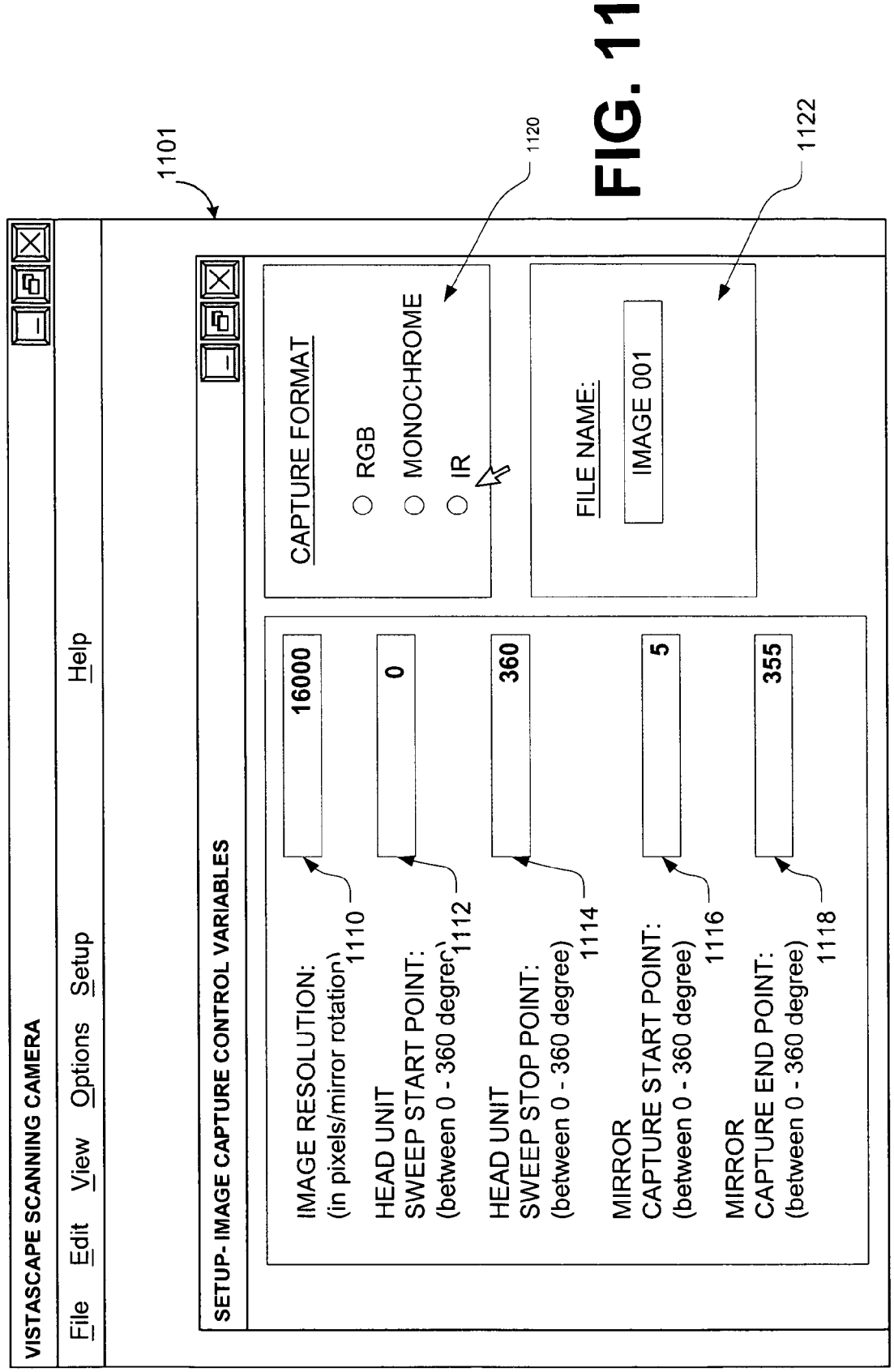
FIG. 11 is a diagram illustrating a GUI 1101 for inputting image capture control variable data.

User interface 1006 may be implemented as, for example, a graphical user interface (GUI) on a touch screen display device, a keypad or a mouse-pointing device used in conjunction with a GUI. One example of such a GUI 1101 is shown in FIG. 11. GUI 1101 provides for input of such control variables as desired image resolution 1110, head unit sweep start point 1112, head unit sweep stop point 1114, mirror capture start point 1116, mirror capture end point 1118, the format of the image to be captured 1120, as well as the file name of the image to be captured 1122.

Figure 12B:
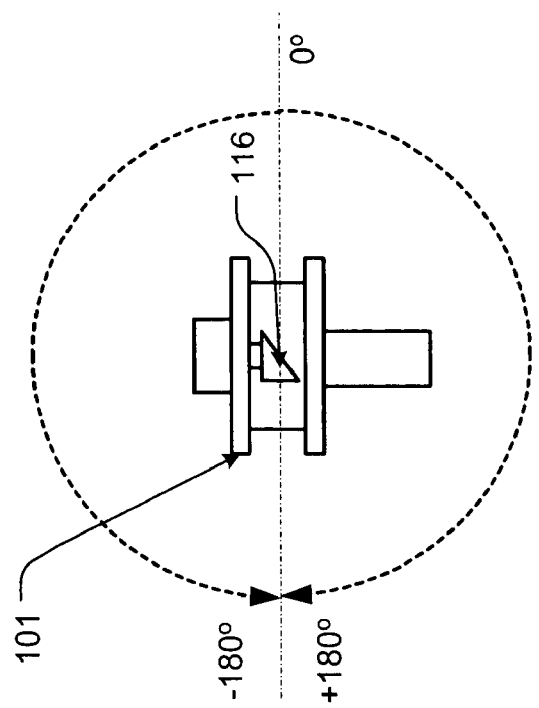
FIG. 12B is a diagram illustrating the full effective range of rotation of head unit 101 during image capture operations.
Figure 12A:
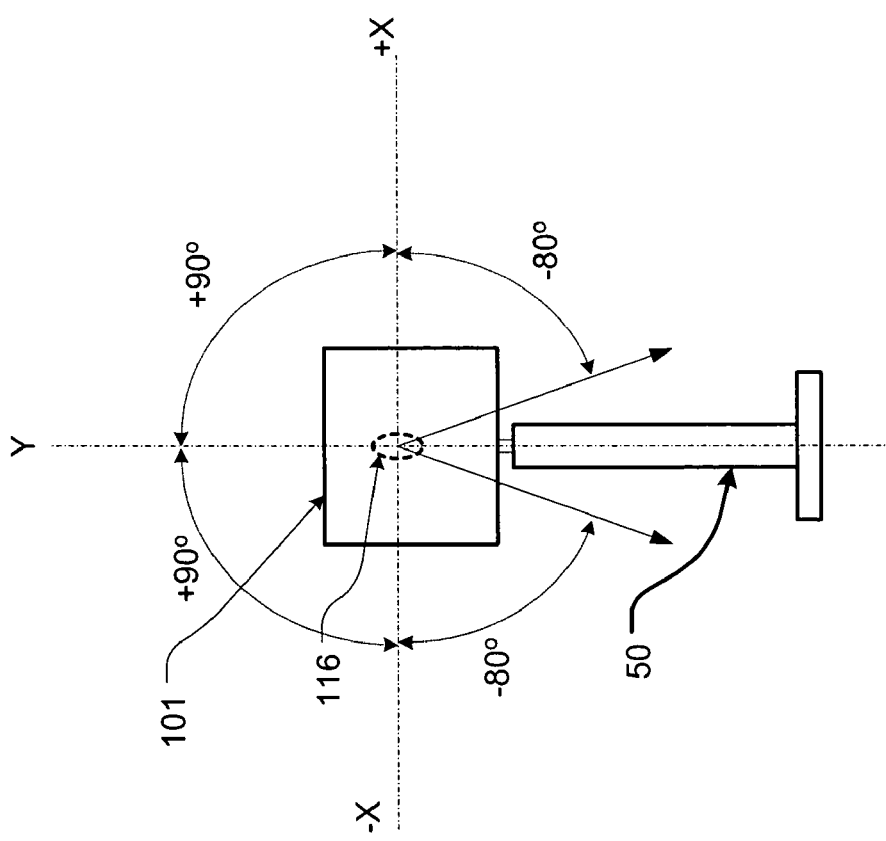
FIG. 12A is a diagram illustrating one example of a limited effective range of rotation of mirror 116 during capture operations.

With additional reference to FIG. 12A, mirror 116 rotates 360° about the axis defined by spindle 111. During image capture operations, pixel image data generated by the imagers 122, 124 and 126 can be stored to image data storage unit 1010 while the mirror 116 is within a range of rotation from, for example, +90° above the horizontal (x-axis) to −80° below the horizontal. This range during which pixel image data is stored to the image data storage unit 1010 is referred to as the effective range of the mirror 116. Activation of the imagers 122, 124, and 126 may be controlled by the respective power and control units 1022, 1024 and 1026, respectively, in accordance with control signals from the system controller 1001 (FIG. 10). Of course, the range could also be 360°, which would include a view of the support 50.

FIG. 12B shows a range of rotation of the head unit 101 during image capture operations. The mirror 116 rotates 360° during image capture operations. In view of this, it is necessary for the head unit 101 to be rotated only 180° about the vertical axis (y-axis) to allow for a complete capture of a 360° scene relative to the head unit 101.

With reference to FIG. 2A as well as FIG. 12A and FIG. 12B, it will be noted that during capture of an image, sweep motor 145 rotates the camera head unit 101 from between 0–360 degree as shown in FIG. 12A and FIG. 12B. Scan motor 110 concurrently rotates the mirror 116 360-degrees about the spindle 111 (FIG. 2A) to receive image light beam 162 reflected from an object 20 in the scene being imaged.

The speed of rotation (rotation speed) of the sweep motor 145 is controlled by the scan motor control 135 in accordance with a sweep control signal from system controller 601. Further, the speed of rotation (rotation speed) of the scan motor 110 is controlled by the scan motor control 125 in accordance with a scan control signal from system controller 601.

Image light 164 received by the mirror 116 is directed to the optical receiver 120 where it strikes the imagers 122, 124 and 126 each of which output a continuous respective image signal representative of the image light incident thereon. Each of the imagers 122, 124 and 126 may be configured to output a continuous stream of analog data. Pixel image data will be generated where image light is received while mirror 116 is rotating. In a preferred embodiment, pixel image data generated by an imager is stored to the image data storage unit 1010 only when mirror 116 is within a predetermined range of rotation. Activation of the image data storage unit 1010 is preferably controlled by the system controller 1010. Imagers 122, 124, and 126 may be controlled by the respective power and control units 1022, 1024 and 1026, respectively in accordance with control signals from the system controller 1001.

Typically the imagers 122, 124 and 126 will be activated during the rotation of mirror 116, only when the mirror 116 is within a predefined range of rotation, such as − 70° to +90°. This predefined range will generally correspond with the mirror rotation start point and mirror rotation end point control input entered via user interface 1006 or, alternatively, retrieved from a storage medium 1005, for example.

After control data is input, either via a user interface 1101 or through retrieval of stored control data, the system controller 601 causes the sweep control 135 to reset sweep motor 145 to a reference, or start point. Rotation of the scan mirror 116 is started. The rotation speed of the scan mirror 116 is monitored by the mirror position sensor 112 and via the control unit 125, which generates a mirror speed signal indicative of speed of rotation of the scan mirror 116. The mirror speed signal is provided to the system controller 1001. Once the scan mirror 116 reaches a predetermined rotation speed and maintains a stable rotation for a predetermined amount of time, system controller 1001 causes the image signals generated by each of the imagers 122, 124 and 126, as well as DDU 150 to be stored directly to image data storage unit 1010.

The process of capturing a scene will be further discussed with reference to FIG. 13. FIG. 13 is a flowchart illustrating the process of image capture carried out by the scan camera 100. During the process of capturing an image, the motor 110 is spun to set speed (1302). In order to ensure stable rotation speed, it may be useful to allow the elapse of a set period of time, for example, 4–12 seconds for the speed to stabiles. The head unit 101 may then be placed to a start position (1304) via rotation of sweep motor 120. The start position will preferably be at a point just prior to the point at which the field of interest is located. For example, if it is desired to capture an image of the field of interest between −20 to +45 degrees of rotation of the head unit 101, the head unit could be positioned at −40 degrees. This helps ensure that the head unit is rotating at the appropriate speed by the time the field of interest is reached by the head unit.

The sweep motor 120 is accelerated to a desired sweep speed, determined by the desired resolution and scan motor speed (1306). Once the sweep motor has reached the capture start point for the image to be captured the image storage device is activated and recording of the pixels image data captured by each imager 122, 124 and 126 is recorded to the image data storage unit 1010 (1308). Data storage unit 1010 is enabled to record one pixel of image data on each rising edge of the pixel clock signal. Controller 1001 monitors the sweep motor speed and position and controls the sweep motor control 125 and scan motor control 25 to maintain the desired rotation speeds.

Once the end capture position is reached, the image data storage unit 1010 is disabled and capture of pixel image data is terminated and the file is closed (1310). An end capture signal is generated and output by controller 601. The scan motor 110 and return sweep motor 120 are then returned to original position, for example, 0° (zero position (1302)). The system is then powered down if necessary, or may be continued for video recording.

In general the time required to capture an image can be expressed as follows:

$$T = HU_R \times (R/(S_M))  \quad\quad\quad EQ.\ 1$$

Where T=capture time per image; $HU_R$ is the range of head unit rotation; R is the desired image resolution $S_M$ is the rotation speed of mirror 216. Similarly, the frequency at which the at which pixels are captured, or sampling frequency, F, may be determined as follows:

$$F = S_M \times R \times 360 \quad\quad\quad EQ.\ 2$$

TABLE 1 below illustrates some representative rotation speeds of mirror 116; sampling frequency and capture times for a given image scan resolution. It should be noted that image scan resolution is expressed as the number of pixels captured/scanned during one degree of rotation of the mirror 116.

TABLE 1

| Scan Resolution (pixels/deg) | Sampling frequency (MHz) | Mirror Rotation Speed (rev/sec) | Time to take 1 full (360 deg) image |
|---|---|---|---|
| 10 | 0.720 | 100 | 18 seconds |
| 44 | 3.168 | 200 | 39.6 seconds |
| 160 | 11.52 | 200 | 144 seconds |

The control system 1000 of the present invention can be implemented in hardware, software, firmware, or a combination thereof. In the preferred embodiment(s), the control system 1000 of the present invention is implemented in software or firmware that is stored in a memory and that is executed by a suitable instruction execution system. If implemented in hardware, as in an alternative embodiment, the components of control system 1000 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The flow chart of FIG. 13 shows the architecture, functionality, and operation of a possible implementation of the control software for controlling the operations of the immersive camera 100. In this regard, each block represents a module, segment, or portion of code, which comprises one or more executable instructions for implementing the specified logical function(s). It should also be noted that in some alternative implementations, the functions noted in the blocks may occur out of the order noted in FIG. 13. For example, two blocks shown in succession in FIG. 13 may in fact be executed substantially concurrently or the blocks may sometimes be executed in the reverse order, depending upon the functionality involved, as will be further clarified hereinbelow.

It should be noted that an alternate embodiment of the present invention does not provide for distance or range information gathering. In this embodiment no distance detection unit or provisions for generating a depth image are provided. In yet a further embodiment, only one imaging device is provided.

It should be emphasized that the above-described embodiments of the present invention, particularly, any "preferred" embodiments or examples, are merely possible examples of implementations, without limitation, for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed:

1. An immersive scanning device for imaging a scene comprising:
a head unit configured to receive an image light beam and generate an image data signal, said head unit comprising a rotating mirror for receiving said image light beam and an optical receiver for receiving said image light beam from said mirror and outputting said image pixel data signal in response thereto, said image data signal comprises a pixel image signal and a pixel distance signal; and
a support unit for supporting and rotating said head unit.

2. The immersive scanning device of claim 1, wherein said optical receiver further comprises a distance generation unit for generating said pixel distance data signal.

3. The immersive scanning device of claim 2, wherein said distance generation unit comprises a distance detection unit for generating said pixel distance data signal.

4. The immersive scanning device of claim 1, wherein said optical receiver further comprises a two dimensional imager for generating a depth image representative of the distance of an object depicted by said pixel image signal from said head unit.

5. The immersive scanning device of claim 1, wherein said depth image comprises a polar plot depicting the distance of a plurality of objects represented by said pixel image signal from said head unit.

6. The immersive scanning device of claim 2, wherein said image pixel data represents one pixel of captured image data.

7. The immersive scanning device of claim 6, wherein said pixel distance data represents the distance of an object depicted by said pixel from said head unit.

8. The immersive scanning device of claim 2, further comprising a control system for controlling said head unit and said support unit.

9. The immersive scanning device of claim 2, wherein said optical receiver comprises an imager for receiving said image light beam and generating said pixel image data.

10. The immersive scanning device of claim 9, wherein said imager comprises a photomultiplier tube (PMT).

11. The immersive scanning device of claim 9, wherein said imager comprises a plurality of imagers.

12. The immersive scanning device of claim 2, further comprising a motor for rotating said mirror in accordance with said control system.

13. The immersive scanning device of claim 2, wherein said optical receiver further comprises an aperture screen for limiting the amount of said image light beam that is received by said imager.

14. The immersive scanning device of claim 13, wherein said aperture screen comprises an aperture of a predetermined size and shape.

15. The immersive scanning device of claim 13, wherein said aperture comprises a square shaped aperture.

16. The immersive scanning device of claim 12, wherein said mirror comprises a 45° angled mirror.

17. The immersive scanning device of claim 12, wherein said motor rotates between 1000 and 12,000 revolutions per minute during an image capture operation.

18. The immersive scanning device of claim 2, further comprising a user interface for inputting control variable information.

19. The immersive scanning device of claim 18, wherein said user interface comprises a graphical user interface (GUI).

20. The immersive scanning device of claim 17, wherein said pixel image signal comprises data representative of a plurality of pixels captured during one revolution of said mirror.

21. The immersive scanning device of claim 17, wherein said pixel image signal comprises data representative of 64,000 pixels captured during one revolution of said mirror.

22. The immersive scanning device of claim 17, wherein said camera support further comprises a sweep motor for rotating said head unit about a predetermine axis of rotation.

23. The immersive scanning device of claim 22, wherein said sweep motor is controlled by said control system.

* * * * *